(12) United States Patent
Gleasman et al.

(10) Patent No.: US 7,475,617 B2
(45) Date of Patent: Jan. 13, 2009

(54) ORBITAL TRANSMISSION WITH GEARED OVERDRIVE

(75) Inventors: James Y. Gleasman, Rochester, NY (US); Keith E. Gleasman, Fairport, NY (US); Matthew R. Wrona, Fairport, NY (US)

(73) Assignee: Torvec, Inc., Rochester, NY (US)

( * ) Notice: Subject to any disclaimer, the term of this patent is extended or adjusted under 35 U.S.C. 154(b) by 500 days.

(21) Appl. No.: 11/153,112

(22) Filed: Jun. 15, 2005

(65) Prior Publication Data

US 2006/0283185 A1    Dec. 21, 2006

(51) Int. Cl.
  *F16H 37/04* (2006.01)
(52) U.S. Cl. ................ 74/665 B; 74/665 GA
(58) Field of Classification Search ........... 74/665 A, 74/65 B, 665 GA, 125.5
  See application file for complete search history.

(56) References Cited

U.S. PATENT DOCUMENTS

| | | | | |
|---|---|---|---|---|
| 1,840,865 A | | 1/1932 | Rayburn et al. ............ 60/453 |
| 1,931,543 A | | 10/1933 | High ..................... 417/269 |
| 1,984,830 A | * | 12/1934 | Higley ................... 475/21 |
| 2,166,857 A | | 7/1939 | Bugatti .................. 92/153 |
| 2,672,095 A | | 3/1954 | Lucien et al. ............ 417/269 |
| 2,678,536 A | | 5/1954 | Morgan .................. 60/455 |
| 2,913,993 A | | 11/1959 | Toulmin, Jr. ............. 91/488 |
| 2,957,421 A | | 10/1960 | Mock .................. 417/222.1 |
| 3,018,737 A | | 1/1962 | Cook et al. ............. 417/269 |
| 3,056,387 A | | 10/1962 | Budzich .................. 91/507 |
| 3,161,023 A | | 12/1964 | Margolin et al. .......... 60/488 |
| 3,292,554 A | | 12/1966 | Hessler ................ 417/269 |
| 3,304,886 A | | 2/1967 | Roberts ................ 417/222.1 |
| 3,616,726 A | | 11/1971 | Ruger .................. 91/488 |
| 3,861,276 A | | 1/1975 | Lucien .................. 91/499 |
| 4,007,663 A | | 2/1977 | Nagatomo et al. .......... 91/6.5 |
| 4,232,587 A | | 11/1980 | Kline .................. 91/499 |
| 4,282,772 A | | 8/1981 | Franch .................. 475/14 |
| 4,478,130 A | | 10/1984 | Brenner et al. ........... 91/6.5 |
| 4,637,293 A | | 1/1987 | Yamaguchi et al. ......... 91/507 |
| 4,776,235 A | | 10/1988 | Gleasman et al. ........... 475/6 |
| 4,776,260 A | | 10/1988 | Vincze ................ 417/269 |
| 4,843,817 A | | 7/1989 | Shivvers et al. .......... 60/487 |
| 4,852,463 A | | 8/1989 | Wagenseil ................ 91/488 |

(Continued)

OTHER PUBLICATIONS

Jeff Bolton, "Infinitely Variable Transmission", Virginia Tech Department of Engineering Science & Mechanics, Powerpoint presentation, http://www.esm.vt.edu/design/presentations/BoltonFinal%20Presentation_files/frame.htm.

*Primary Examiner*—Ha D. Ho
(74) *Attorney, Agent, or Firm*—Brown & Michaels, PC

(57) ABSTRACT

The transmission includes an orbital gear complex in combination with a variable hydraulic pump and motor. The input to the transmission is increased in speed by the orbital gearing such that, when the pump and motor are not operating, the orbiter is stationary, and the orbital gearing produces an overdrive condition. A gear reduction is accomplished by rotating the web with the web-rotating device, providing a high gear reduction. The pump and motor are preferably long-piston hydraulic machines with infinitely variable swash plates. The hydraulic machines preferably have wobblers stabilized by full gimbals and hold-down plates with elongated holes for the long pistons to eliminate possible impacts between the hold-down plates and the head ends of the long pistons when the swash-plates are at or near their maximum angle of inclination.

12 Claims, 10 Drawing Sheets

U.S. PATENT DOCUMENTS

| | | | |
|---|---|---|---|
| 4,895,052 A | 1/1990 | Gleasman et al. | 475/7 |
| 4,901,529 A | 2/1990 | Iino et al. | 60/489 |
| 4,944,154 A | 7/1990 | Kawahara et al. | 60/488 |
| 4,967,556 A | 11/1990 | Inour | 60/489 |
| 4,993,380 A | 2/1991 | Hsu | 92/153 |
| 5,000,667 A | 3/1991 | Taguchi et al. | 417/222.1 |
| 5,170,872 A | 12/1992 | Salicini | 192/48.2 |
| 5,186,692 A * | 2/1993 | Gleasman et al. | 475/82 |
| 5,390,751 A * | 2/1995 | Puetz et al. | 180/6.48 |
| 5,440,878 A | 8/1995 | Gleasman et al. | 60/487 |
| 5,513,553 A | 5/1996 | Gleasman et al. | 92/12.2 |
| 5,630,707 A | 5/1997 | Kim et al. | 417/269 |
| 5,704,272 A | 1/1998 | Durako et al. | 92/57 |
| 5,988,041 A | 11/1999 | Hiramatsu et al. | 92/71 |
| 6,085,521 A | 7/2000 | Folsom et al. | 60/490 |
| 6,216,670 B1 | 4/2001 | Anderson et al. | 417/269 |
| 6,321,635 B1 | 11/2001 | Fujita | 92/71 |
| 6,342,021 B1 * | 1/2002 | Gleasman et al. | 475/18 |
| 6,568,917 B2 | 5/2003 | Fujii et al. | 417/269 |
| 6,644,936 B1 | 11/2003 | Muta | 417/269 |
| 6,663,354 B2 | 12/2003 | Forster | 417/269 |
| 6,748,817 B2 * | 6/2004 | Gleasman et al. | 74/125.5 |
| 6,786,704 B2 | 9/2004 | Kamiya et al. | 417/222.2 |

* cited by examiner

ORBITAL TRANSMISSION WITH GEARED OVERDRIVE

REFERENCE TO RELATED APPLICATIONS

The subject matter of this application is related to the subject matter in co-pending U.S. patent application Ser. No. 10/789,739, entitled "LONG-PISTON HYDRAULIC MACHINES", filed Feb. 27, 2004. This application is herein incorporated by reference.

The subject matter of this application is also related to the subject matter in co-pending application entitled "DUAL HYDRAULIC MACHINE TRANSMISSION", filed on the same day as the present application. This application is herein incorporated by reference.

BACKGROUND OF THE INVENTION

1. Field of the Invention

The invention pertains to the field of automotive transmissions. More particularly, the invention pertains to an automotive transmission with orbital gearing and a variable web-rotating device.

2. Description of Related Art

Hydraulic pumps and motors with adjustable swash plates have been discussed for use in automotive transmissions for decades, but there have been difficulties in building a hydraulic pump and motor that is both lightweight and powerful enough at the speeds and pressures necessary for use in an automobile. Traditionally, hydraulic pump/motors with adjustable swash plates have a fixed swash and a rotating cylinder block. This arrangement works well for pump/motors for applications such as golf carts and machinery, but for high pressure, high speed use in automobiles a rotating cylinder block is too large, too heavy, and too inefficient. While prior art relating to hydraulic machines has disclosed stationary cylinder blocks and split swash plates for nearly a century, no designs have proven commercially successful for use with the combination of high speeds and pressures required for automotive drives. The problem has primarily resided in the difficulty of providing a sufficiently stable piston/swash interface.

In U.S. Pat. No. 5,440,878, "VARIABLE HYDRAULIC MACHINE", issued Aug. 15, 1995 to Gleasman et al., the piston-swash interface problem is addressed. Long dog bones interconnect the pistons and the swash, and to prevent the collapse of the dog bones under rotational stresses, the wobbler of the swash is supported by a gimbal structure. A full gimbal structure may be used with the fixed angle swash plates used on the motors, but a half-gimbal is used on the variable angle pumps. Prototypes of these machines exhibited undesirable vibrations and pulsations, indicating that the hydraulic machine could be improved.

In U.S. Pat. No. 5,513,553, "HYDRAULIC MACHINE WITH GEAR-MOUNTED SWASH-PLATE", issued May 7, 1996 to Gleasman et al., an alternative to the gimbal is described. A spherical gear with spherical gear teeth meshes with gear teeth on the wobbler to stabilize the dog bones and wobbler by providing additional points of contact in comparison to the half-gimbal. This design, however, proved to be complicated to manufacture.

In U.S. Published Application No. 2004/0168567, "LONG-PISTON HYDRAULIC MACHINES", published Sep. 2, 2004 to Gleasman et al., the dog bones are replaced with long pistons and the gimbal and spherical gearing are eliminated. Spring pressure "hold down" is used to maintain the shoes of the long pistons in contact with the wobbler. No restraint is required to prevent collapse, since the long pistons do not collapse under rotational stresses or in the absence of hydraulic pressure. However, there is rotational stress placed on the wobbler by the high speed of rotation of the rotor, and the effects of this stress cause undesirable inertial rotation of the wobbler.

There is a need in the art for variable hydraulic pumps and motors powerful, efficient, lightweight, and small enough to be appropriate for automotive transmission use.

In U.S. Pat. No. 6,748,817, "TRANSMISSION WITH MINIMAL ORBITER", issued Jun. 15, 2004 to Gleasman et al., a variable pump and motor are combined with a gear orbiter to form an infinitely variable transmission. In this transmission, as the speed of the hydraulic motor increases, the output shaft speed increases and the speed of the vehicle increases.

Although an internal combustion engine is the industry standard for automobiles in the United States, several major automobile manufacturers are researching a homogeneous-charge-compression-ignition (HCCI) engine. In a conventional gasoline engine, the air-fuel mixture is ignited by a spark plug to create power. In an HCCI engine, similar to in a diesel engine, a piston compresses the air-fuel mixture to increase its temperature until it ignites. It is estimated that an HCCI engine is capable of a 30% increase in fuel economy over a standard gasoline internal combustion engine. A major hurdle for implementation of HCCI technology in automobiles is a difficulty in controlling the combustion at low and high engine speeds.

There is a need in the art for a transmission, which provides the necessary power to run an automobile while allowing its engine speed to remain in a relatively narrow low-to-moderate range where the combustion in HCCI engines is more easily controlled. Such a transmission allows implementation of more fuel efficient HCCI engines on gasoline-powered vehicles.

SUMMARY OF THE INVENTION

The transmission includes an orbital gear complex in combination with a variable hydraulic pump and motor that operates unlike known automotive transmissions. Contrary to conventional transmissions: when the web rotating device rotates the web at its highest speed in the same direction as the engine, the transmission produces a reverse output at its highest speed; then, when the web is moved at a slightly slower speed, the output of the transmission produces neutral (no output); thereafter, as the rotation of the web in the direction of the engine is further slowed, the transmission produces a continuously decreasing gear reduction. When the web is at rest, the transmission provides an overdrive condition. When the web is rotated in a direction opposite to the engine, the transmission provides continuously higher overdrive ratios. The pump and motor are preferably long-piston hydraulic machines with infinitely variable swash plates. The hydraulic machines preferably have wobblers stabilized by full gimbals and hold-down plates with elongated holes for the long pistons.

DETAILED DESCRIPTION OF THE INVENTION

Figure 1:
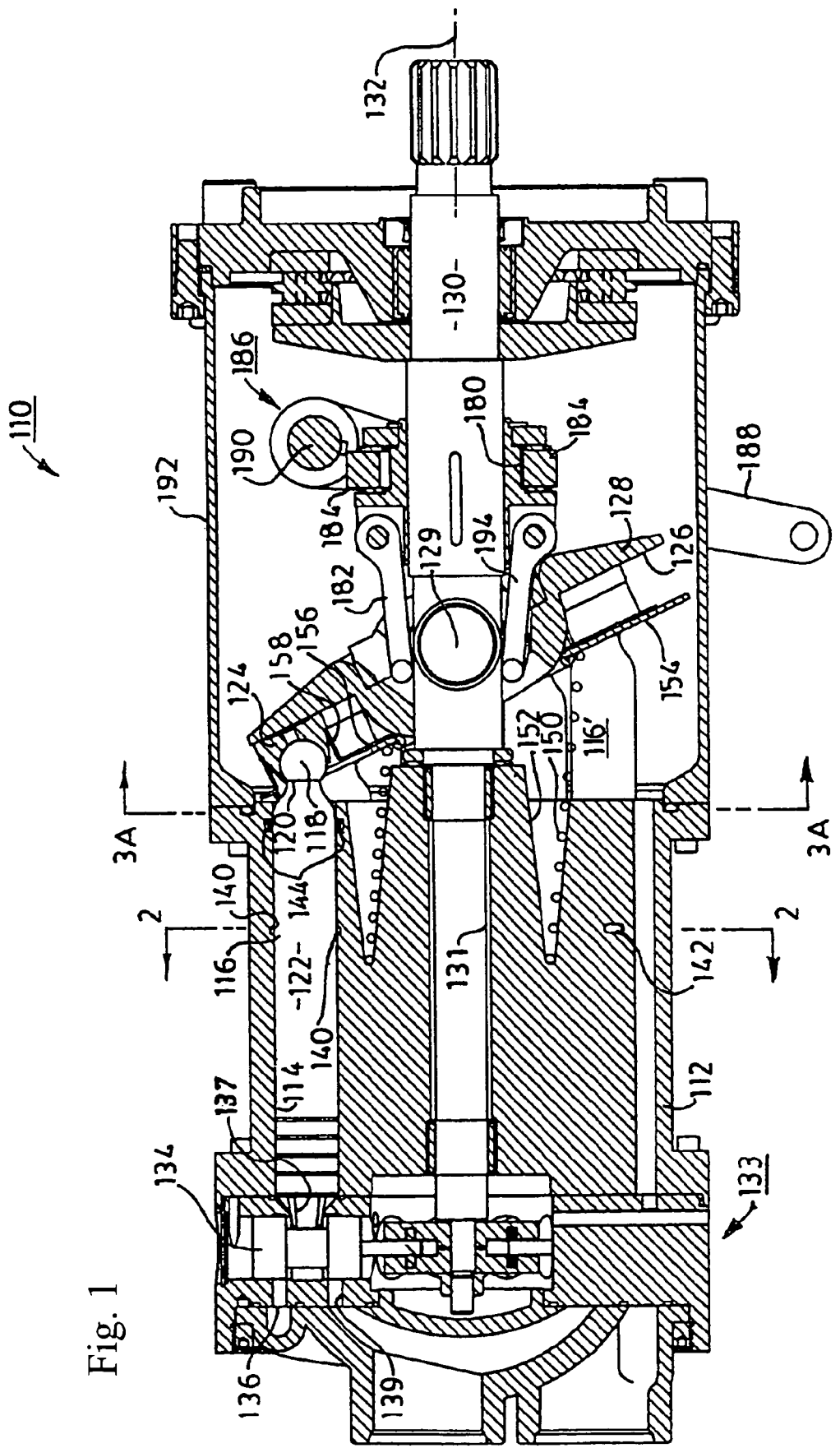
FIG. 1 shows a partially schematic and cross-sectional view of a hydraulic machine with a variable swash plate angle. This hydraulic machine is used as both the preferred pump and as the preferred motor for this invention.

A transmission according to the invention includes a gear complex with an orbital web in combination with a web-rotating device for varying gear ratios. Preferably, the web-rotating device is a variable hydraulic pump and motor. The input to the transmission is increased in speed by the orbital gearing such that, when the pump and motor are not operating, and the orbiter is stationary, the orbital gearing produces an overdrive condition. A gear reduction is accomplished by rotating the web with the web-rotating device, providing a high gear reduction.

The transmission is appropriate for automotive use. While an orbital gear complex of the present invention may appear to be similar to the complex disclosed in U.S. Pat. No. 6,748,817, the differences provide substantially different results. The relative size of the input gear and its mating cluster gear are reversed. Instead of a conventional input speed reduction, the input speed is increased by the orbital gearing. Reduction of the input speed is controlled by the hydraulics, and overdrive is achieved purely with the orbital gearing. This change eliminates the need for an additional gear reduction and simplifies the overdrive structure. In other words, when the hydraulic motor is stopped because the hydraulic pump is at "zero" swash angle, the output shaft of the transmission is rotating faster than the input shaft.

The continuous and infinite-progression gear ratio change of the invention's transmission occurs without any significant change in the speed of vehicle's engine, and this continuous and infinite progression extends through a remarkably wide range from a predetermined low gear ratio (e.g., 22:1) up through an extended overdrive (e.g., as high as 0.62:1) The engine may be maintained at a relatively low and efficient operational level (e.g., 500 RPM) throughout the entire acceleration from a standing stop up to overdrive. This feature not only results in fuel savings but, more importantly, in significant reduction of pollutants. This is particularly true for diesel engine vehicles, since the engine's selected operational speed can be predetermined at a "sweet spot" which optimizes performance. As is well known, when a diesel engine operates at a constant speed, it discharges little, if any, pollutants.

This same feature can provide significant fuel savings despite the fact that the engine runs well below the "sweet spot" for which transmissions of the prior art are designed. The sweet spot of an engine is the conventional optimal efficiency engine speed, which is the region of the efficiency map where the engine is most efficient at converting fuel into mechanical power. For most automobile engines, the sweet spot is found in the region of 1500 RPM (the region of maximum efficiency of the torque converters of most conventional automatic transmissions). A transmission of the present invention improves fuel economy despite the fact that it may maintain the engine at a speed where the engine is not running at optimum efficiency. This loss in efficiency is more than compensated by the reduced fuel requirements of running at lower speeds (e.g., at 500 RPM rather than 1500 RPM). A further advantage of running at such low engine speeds is a reduced pressure demand on the hydraulic pump and motor, thereby reducing the duty cycle on the hydraulics and further improving their durability.

In terms of fuel economy, an orbital transmission of the present invention brings city driving efficiency up to highway driving efficiency. Since city driving accounts for about 60% of all driving, incorporation of a transmission of the present invention into automobiles should provide a significant fuel savings. Of course, since today's engines are designed to run most efficiently in the range of 1500 RPM, even further fuel savings may be achieved by combining a transmission of the present invention with an automobile engine designed to run most efficiently around 500 RPM.

A transmission of the present invention is capable of varying the speed of the drive shaft with minimal changes to engine speed. Thus, the present invention allows engine speed to remain in a relatively narrow low-to-moderate range where the combustion in the recently proposed HCCI engines is more easily controlled. A transmission of the present invention is highly compatible with implementation of more fuel efficient HCCI engines on gasoline-powered vehicles.

The pump and motor of the invention are preferably long-piston hydraulic machines with infinitely variable swash plates. Both hydraulic machines preferably have split swash-plates that include a rotating and nutating "rotor" that is driven by the input axle and a nutating-only "wobbler" that rides on the surface of the rotor on bearings. In one embodiment of the invention, the bearings are needle bearings. The sliding shoes on the long piston heads move in a "figure eight" path over the surface of the nutating wobbler. However, during the relative motion of the sliding shoes on the wobbler, this "figure eight" is really a lemniscate in three dimensions on the surface of an imaginary sphere having a diameter that decreases as the angle of the swash increases.

In long-piston hydraulic machines of the present invention, the wobbler is stabilized by a full gimbal. As the wobbler nutates, the distribution of piston shoe pressure on the wobbler varies during each cycle, as the individual pistons change direction. This varying pressure tends to introduce undesired vibrations into the nutating wobbler motion. The full gimbal helps to maintain the nutating-only motion of the wobbler and reduce the undesired vibrations. The velocity of the shoe slippage is restrained by the gimbal-mounted wobbler.

In another embodiment of the present invention, a hold-down plate is used to help maintain the piston shoes against the wobbler of the gimbal-mounted swash-plate. The holes in the hold-down plate are elongated rather than circular. Computer modeling shows that increasing the elongation of the piston holes in the hold-down plate, especially the holes which are the farthest away from the two gimbal anchor points, eliminates impact between the piston shoes and the edges of the holes of the hold-down plate.

Although the hydraulic pump and motor of the invention may be used in combination as a stand-alone transmission, the addition of the orbital gear complex allows a significant decrease in the size of the pump and motor. In an orbital transmission of the present invention, the hydraulic pump and motor are never doing 100% of the work. The reduction of load on the hydraulics as a result of the gearing also increases the durability of the pump and motor.

An orbital gear complex is combined with a variable web-rotating device to form a minimal orbiter. The variable web-rotating device may be any device capable of producing a variable output. An electric generator in combination with an electric motor may be used as the web-rotating device. A variable brake may also be used as the web-rotating device. In a preferred embodiment, a variable hydraulic pump with a variable hydraulic motor serves as the web-rotating device. The orbital gearing produces an overdrive condition when the web is stationary. A gear reduction is accomplished by rotating the web with the web-rotating device, which allows for a high gear reduction. In a preferred embodiment, the pump and motor are more preferably long-piston hydraulic machines with infinitely variable swash plates with full gimbals and elongated holes on the hold-down plate. In a preferred embodiment, a pair of hydraulic machines is used in combination with an orbital gearing system to form a transmission with a minimal orbiter. The hydraulics effect the gear reduction, and overdrive may be achieved purely with the orbital gearing.

Long-Piston Hydraulic Machine

Referring to FIG. 1, a variable hydraulic machine 110 includes a modular fixed cylinder block 112. Cylinder block 112 has a plurality of cylinders 114 (only one shown) in which a respective plurality of mating pistons 116 reciprocate between the retracted position of piston 116 and variable extended positions (the maximum extension being shown in the position of piston 116'). Each piston has a spherical head 118 that is mounted on a neck 120 at one end of an elongated axial cylindrical body portion 122 that is substantially as long as the length of each respective cylinder 114. Each spherical piston head 118 fits within a respective shoe 124 that slides over a flat face 126 formed on the surface of a rotor 128 that is pivotally attached to a drive element, namely, shaft 130 that is supported on bearings within a bore in the center of cylinder block 112.

In one embodiment, hydraulic machine 110 is preferably provided with a modular valve assembly 133 that is bolted as a cap on the left end of modular cylinder block 112 and includes a plurality of spool valves 134 (only one shown) that regulate the delivery of fluid into and out of cylinders 114. In another embodiment, a plurality of check valves is alternatively used.

The machine 110 can be operated as either a pump or as a motor. For operation as a motor, during the first half of each revolution of drive shaft 130, high pressure fluid from an inlet 136 enters the valve end of each respective cylinder 114 through a port 137 to drive each respective piston from its retracted position to its fully extended position. During the second half of each revolution, lower pressure fluid is withdrawn from each respective cylinder through port 137 and fluid outlet 139 as each piston returns to its fully retracted position.

For operation as a pump, during the one half of each revolution of drive shaft 130, lower pressure fluid is drawn into each respective cylinder 114 entering a port 137 from a "closed loop" of circulating hydraulic fluid through inlet 136 as each piston 116 is moved to an extended position. During the next half of each revolution, the driving of each respective piston 116 back to its fully retracted position directs high pressure fluid from port 137 into the closed hydraulic loop through outlet 139. The high pressure fluid is then delivered through appropriate closed loop piping (not shown) to a mating hydraulic machine, e.g., hydraulic machine 110 discussed above, causing the pistons of the mating machine to move at a speed that varies with the volume (gallons per minute) of high pressure fluid being delivered in a manner well known in the art.

The cylindrical wall of each cylinder 114 in modular cylinder block 112 is transected radially by a respective lubricating channel 140 formed circumferentially therein. A plurality of passageways 142 interconnect all lubricating channels 140 to form a continuous lubricating passageway in cylinder block 112.

Each respective lubricating channel 140 is substantially closed by the axial cylindrical body 122 of each respective piston 116 during the entire stroke of each piston. That is, the outer circumference of each cylindrical body 122 acts as a wall that encloses each respective lubricating channel 140 at all times. Thus, even when pistons 116 are reciprocating through maximum strokes, the continuous lubricating passageway interconnecting all lubricating channels 140 remains substantially closed off. Continuous lubricating passageway 140, 142 is simply and economically formed within cylinder block 112.

During operation of hydraulic machine 110, all interconnected lubricating channels 140 are filled almost instantly by a minimal flow of high-pressure fluid from inlet 136 entering each cylinder 114 through port 137 and being forced between the walls of the cylinders and the outer circumference of each piston 116. Loss of lubricating fluid from each lubricating channel 140 is restricted by a surrounding seal 144 located near the open end of each cylinder 114. Nonetheless, the lubricating fluid in this closed continuous lubricating passageway of lubricating channels 140 flows moderately but continuously as the result of a continuous minimal flow of fluid between each of the respective cylindrical walls of each cylinder and the axial cylindrical body of each respective piston in response to piston motion and to the changing pressures in each half-cycle of rotation of drive shaft 130 as the pistons reciprocate. As the pressure in each cylinder 114 is reduced to low pressure on the return stroke of each piston 116, the higher pressure fluid in otherwise closed lubricating passageway 140, 142 is again driven between the walls of each cylinder 114 and the outer circumference of body portion 122 of each piston 116 into the valve end of each cylinder 114 experiencing such pressure reduction.

The flow of lubricating fluid in closed continuous lubricating passageway 140, 142 is moderate but continuous as the result of a secondary minimal fluid flow in response to piston motion and to the changing pressures in each half-cycle of rotation of drive shaft 130 as the pistons reciprocate.

Rotor 128 of pump 110 is pivotally mounted to drive shaft 130 about an axis 129 that is perpendicular to axis 132. Therefore, while rotor 128 rotates with drive shaft 130, its angle of inclination relative to axis 130 is preferably variable from 0° (i.e., perpendicular) to ±25°. In FIG. 1, rotor 128 is inclined at +25°. This variable inclination is controlled as follows: The pivoting of rotor 128 about axis 129 is determined by the position of a sliding collar 180 that surrounds drive shaft 130, and is movable axially relative thereto. A control link 182 connects collar 180 with rotor 128 so that movement of collar 180 axially over the surface of drive shaft 130 causes rotor 128 to pivot about axis 129. For instance, as collar 180 is moved to the right in FIG. 1, the inclination of rotor 128 varies throughout a continuum from the +25° inclination shown, back to 0° (i.e., perpendicular), and then to −25°.

The axial movement of collar 180 is controlled by the fingers 184 of a yoke 186 as yoke 186 is rotated about the axis of a yoke shaft 190 by articulation of a yoke control arm 188. Yoke 186 is actuated by a conventional linear servo-mechanism (not shown) connected to the bottom of yoke arm 188. While the remaining elements of yoke 186 are all enclosed within a modular swash plate housing 192, and yoke shaft 190 is supported in bearings fixed to housing 192, yoke control arm 188 is positioned external of housing 192. Swash plate rotor 128 is balanced by a shadow link 194 that is substantially identical to control link 182 and is similarly connected to collar 180 but at a location on exactly the opposite side of collar 180.

Figure 2:
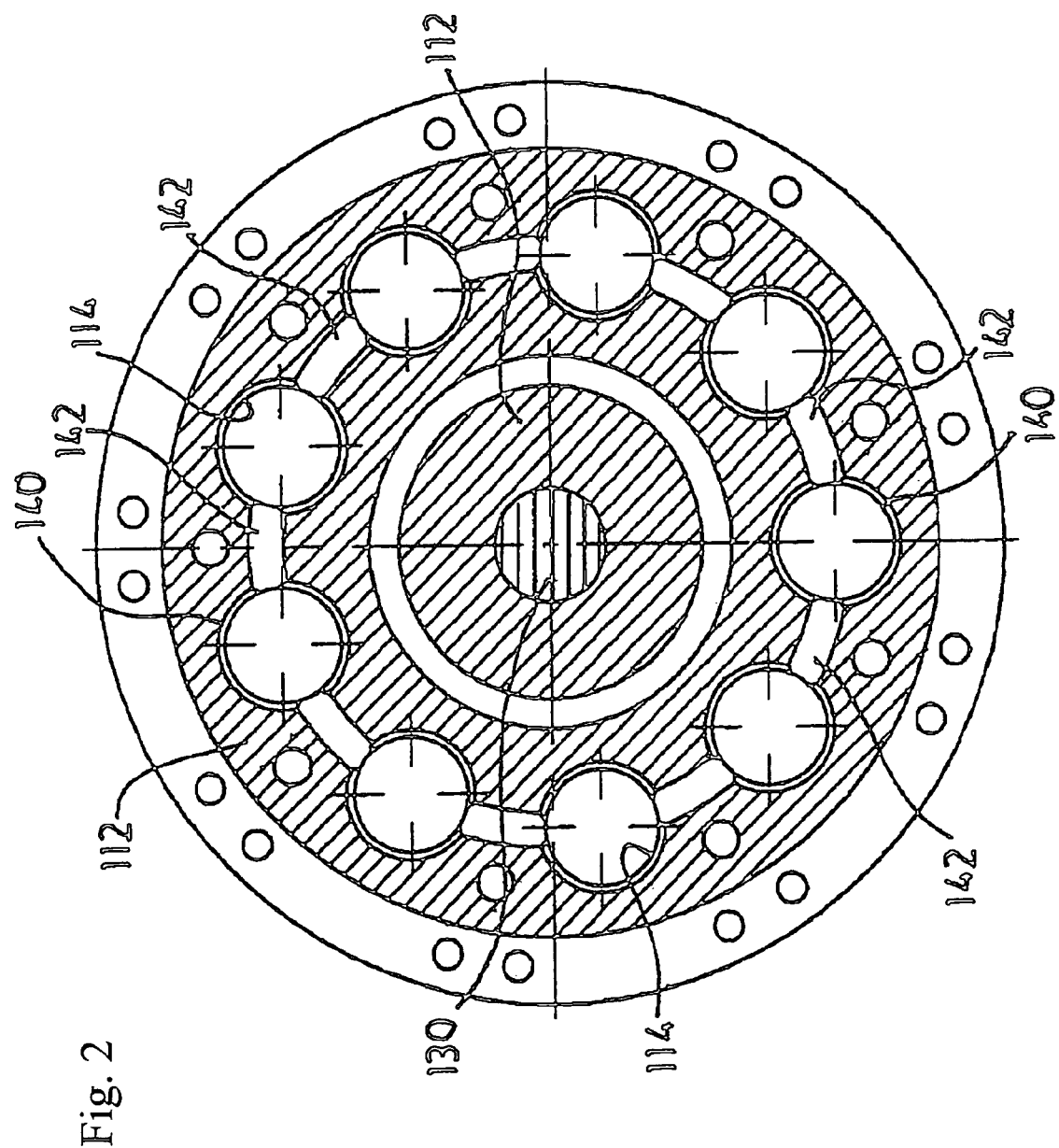
FIG. 2 shows a partially schematic and cross-sectional view of the hydraulic machine of FIG. 1 taken along the plane 2-2 with parts being omitted for clarity.

Referring to both FIG. 1 and FIG. 2, the cylindrical wall of each cylinder 114 is transected radially by a respective lubricating channel 140 formed circumferentially therein. A plurality of passageways 142 interconnect all lubricating channels 140 to form a continuous lubricating passageway in cylinder block 112. Each respective lubricating channel 140 is substantially closed by the axial cylindrical body 122 of each respective piston 116 during the entire stroke of each piston. That is, the outer circumference of each cylindrical body 122 acts as a wall that encloses each respective lubricating channel 140 at all times. Thus, even when pistons 116 are reciprocating through maximum strokes, the continuous lubricating passageway interconnecting all lubricating channels 140 remains substantially closed off. Continuous lubricating passageway 140, 142 is simply and economically formed within cylinder block 112 as can be best appreciated from the schematic illustration in FIG. 2 in which the relative size of the fluid channels and connecting passageways and has been exaggerated for clarification.

During operation of hydraulic machine 110, all interconnected lubricating channels 40 are filled almost instantly by a minimal flow of high-pressure fluid from inlet 36 entering each cylinder 114 through port 137 and being forced between the walls of the cylinders and the outer circumference of each piston 116. Loss of lubricating fluid from each lubricating channel 140 is restricted by a surrounding seal 144 located near the open end of each cylinder 114. Nonetheless, the lubricating fluid in this closed continuous lubricating passageway of lubricating channels 140 flows moderately but continuously as the result of a continuous minimal flow of fluid between each of the respective cylindrical walls of each cylinder and the axial cylindrical body of each respective piston in response to piston motion and to the changing pressures in each half-cycle of rotation of drive shaft 130 as the pistons reciprocate. As the pressure in each cylinder 114 is reduced to low pressure on the return stroke of each piston 116, the higher pressure fluid in otherwise closed lubricating passageway 140, 142 is again driven between the walls of each cylinder 114 and the outer circumference of body portion 122 of each piston 116 into the valve end of each cylinder 114 experiencing such pressure reduction.

Figures 3A, 3B:
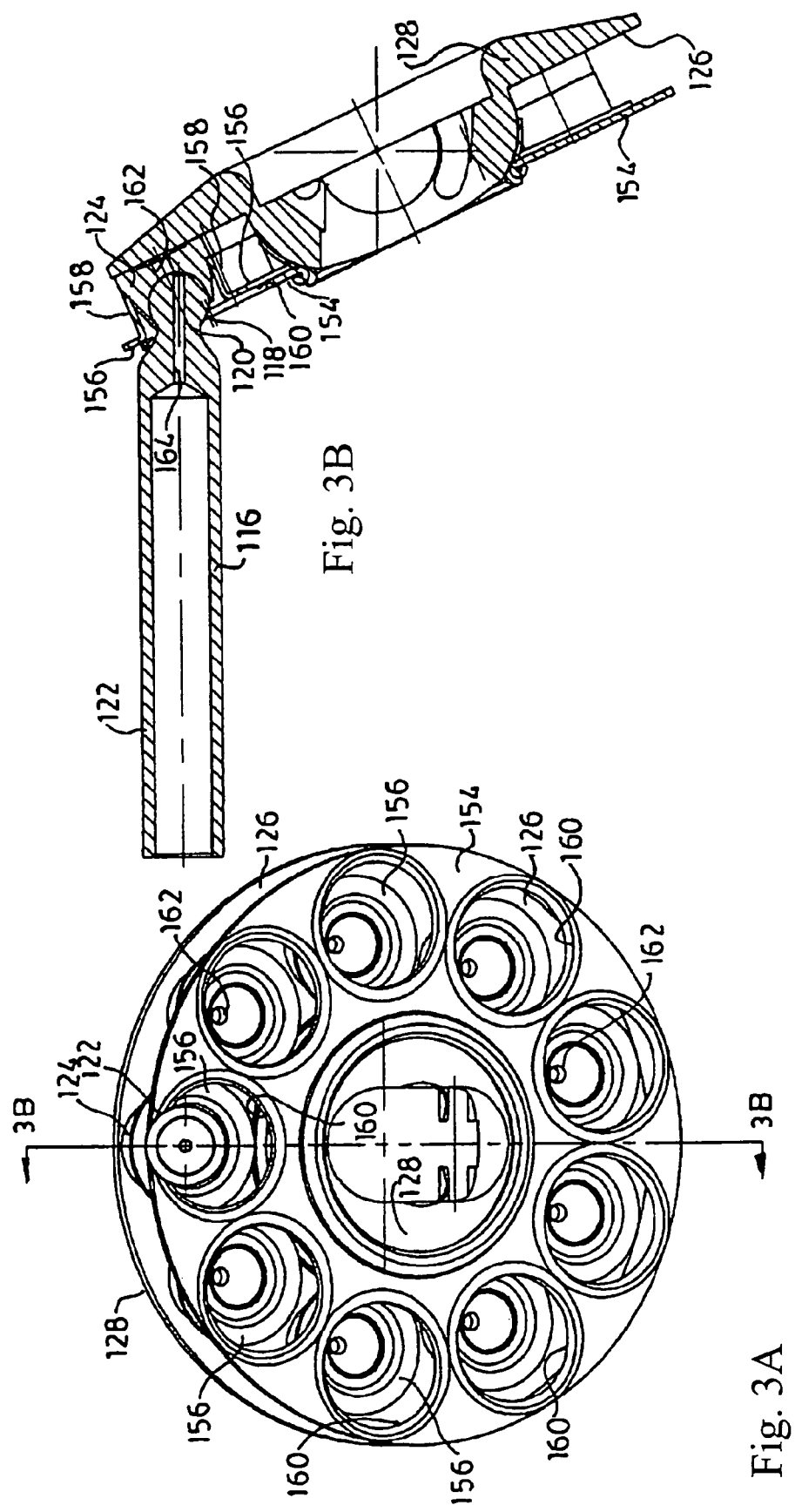
FIG. 3A shows a partially schematic view of a hold-down plate, when the swash plate is inclined at +25°, as seen from the plane 3A-3A of FIG. 1.
FIG. 3B shows a partially cross-sectional view of the swash plate and piston hold-down assembly, the view being taken in the plane 3B-3B of FIG. 3A.

Referring to FIG. 3A and FIG. 3B, a hold-down assembly for a hydraulic machine includes a hold-down element 154 with a plurality of circular openings 160, each of which surrounds the neck 120 of a respective piston 116. The swash plate is at +25° angle in FIG. 3A and FIG. 3B. FIG. 3A shows the hold-down plate 154 from the perspective of looking down the shaft of the rotor 128, or from plane 3A-3A of FIG. 1. A plurality of special washers 156 is positioned, respectively, between hold-down element 154 and each piston shoe 124. Each washer 156 has an extension 158 that contacts the outer circumference of a respective shoe 124 to maintain the shoe in contact with flat face 126 of rotor 128 at all times. Each respective shoe cavity is connected through an appropriate shoe channel 162 and piston channel 164 to assure that fluid pressure present at the shoe-rotor interface is equivalent at all times with fluid pressure at the head of each piston 116.

Fluid pressure constantly biases pistons 116 in the direction of rotor 128, and the illustrated thrust plate assembly is provided to carry that load. However, at the speeds of operation required for automotive use (e.g., 4000 rpm) additional bias loading is necessary to assure constant contact between piston shoes 124 and flat surface 126 of rotor 128. The variable hydraulic machines provide such additional bias by using one of three simple spring-biased hold-down assemblies.

The first hold-down assembly, for hydraulic machine 110, includes a coil spring 150 that is positioned about shaft 130 and received in an appropriate crevice 152 formed in cylinder block 112 circumferentially about axis 132. Coil spring 150 biases a hold-down element 154 that is also positioned circumferentially about shaft 130 and axis 132. Hold-down element 154 is provided with a plurality of circular openings 160, each of which surrounds the neck 120 of a respective piston 116. A plurality of special washers 156 is positioned, respectively, between hold-down element 154 and each piston shoe 124. Each washer 156 has an extension 158 that contacts the outer circumference of a respective shoe 124 to maintain the shoe in contact with flat face 126 of rotor 128 at all times.

The positions of the swash plate and piston shoe hold-down assembly change relative to each other, as the inclination of rotor 128 is altered during machine operation. Referring to the relative position of these parts at 0° inclination, each piston channel 164 has the same radial position relative to each respective circular opening 160 in hold-down element 154. At all inclinations other than 0°, the relative radial position of each piston channel 164 is different for each opening 160, and the relative positions of each special washer 156 is also different. The different relative positions at each of the nine openings 160 are themselves constantly-changing as rotor 128 rotates and nutates through one complete revolution at each inclination. For instance, at the 25° inclination shown in FIG. 3A, if during each revolution of rotor 128, one were to watch the movement occurring through only the opening 160 at the top (i.e., at 12 o'clock) of hold-down element 154, the relative position of the parts viewed in the top opening 160 would serially change to match the relative positions shown in each of the other eight openings 160.

At inclinations other than 0°, during each revolution of rotor 128, each special washer 156 slips over the surface of hold-down element 154 as, simultaneously, each shoe 124 slips over the flat face 126 of rotor 128. Each of these parts changes relative to its own opening 160 through each of the various positions that can be seen in each of the other eight openings 160. Each follows a cyclical path (that appears to trace a lemniscate, i.e., a "figure-eight") that varies in size with the angular inclination of swash plate rotor 128 and the horizontal position of each piston 116 in fixed cylinder block 112. To assure proper contact between each respective shoe 124 and flat surface 126 of rotor 128, a size is preferably selected for the boundaries of each opening 160 so that the borders of opening 160 remain in contact with more than one-half of the surface of each special washer 156 at all times during each revolution for all inclinations of rotor 128.

Figure 4:
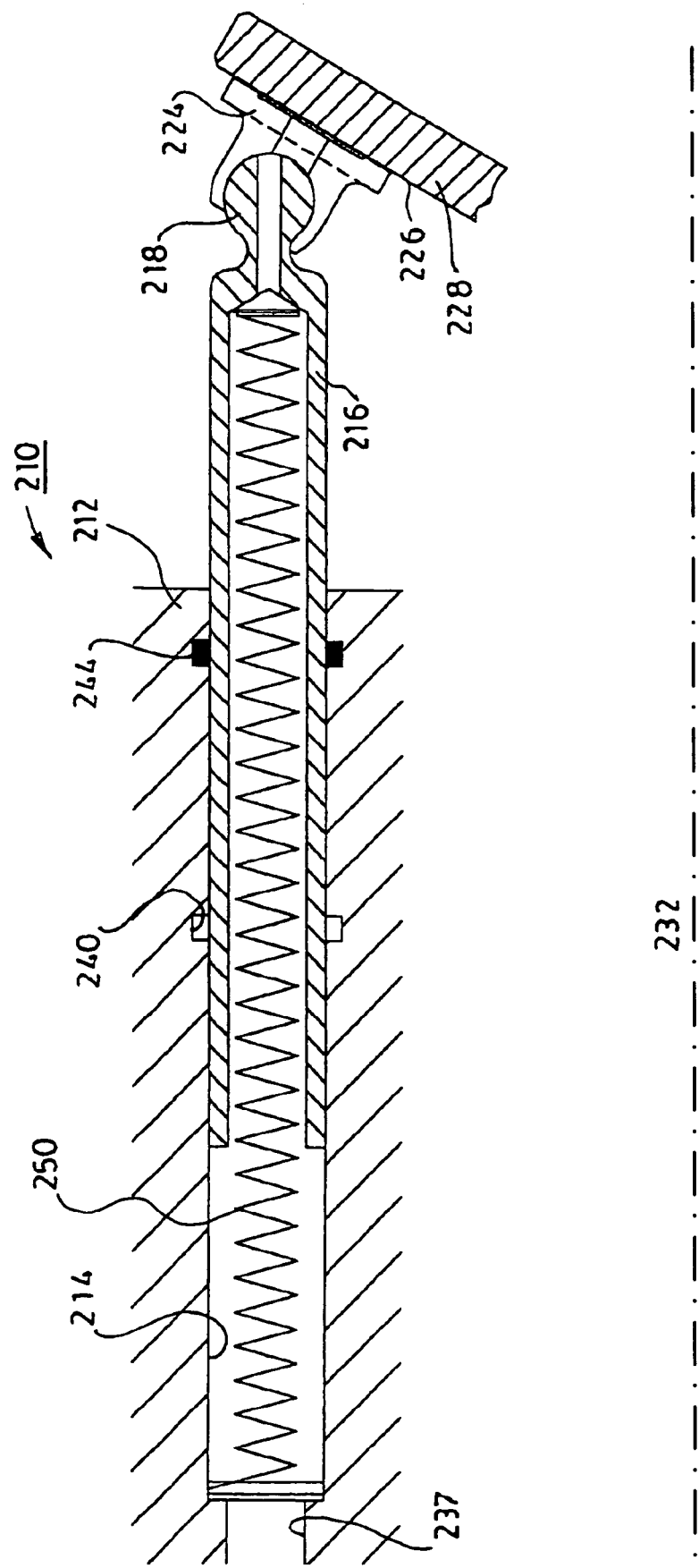
FIG. 4 shows a cross-sectional view of a single cylinder with a long spring.

A second hold-down assembly is shown schematically in FIG. 4 in an enlarged, partial, and cross-sectional view of a single piston of a hydraulic machine 210. Each piston 216 is positioned in the modular fixed cylinder block 212 within a cylinder 214, the latter being transected radially by a respective lubricating channel 240 formed circumferentially therein. In the same manner as described in relation to the other hydraulic machines already detailed above, each lubricating channel 240 is interconnected with similar channels in the machine's other cylinders to form a continuous lubricating passageway in cylinder block 212. An optional surrounding seal 244 may be located near the open end of each cylinder 214 to minimize further the loss of lubricating fluid from each lubricating channel 240.

Fixed cylinder block 212 includes neither a large axially circumferential coil spring nor an axially circumferential crevice for holding same. The modular fixed cylinder block 212 of hydraulic machine 210 can be connected to either a modular fixed-angle swash plate assembly or a modular variable-angle swash plate assembly, but in either case, hydraulic machine 210 provides a much simpler hold-down assembly. Namely, the hold-down assembly of this embodiment includes only a respective conventional piston shoe 224 for each piston 216 in combination with only a respective coil spring 250, the latter also being associated with each respective piston 216.

Each piston shoe 224 is similar to the conventional shoes shown in the first hold-down assembly and is mounted on the spherical head 218 of piston 216 to slide over the flat face 226 formed on the surface of the machine's swash plate rotor 228. Each coil spring 250 is, respectively, seated circumferentially about hydraulic valve port 237 at the valve end of each respective cylinder 214 and positioned within the body portion of each respective piston 216.

Each shoe 224 slips over flat face 226 of rotor 228 with a lemniscate motion that varies in size with the horizontal position of each piston 216 and the inclination of rotor 228 relative to axis 232. During normal operation of hydraulic machine 210, shoes 224 are maintained in contact with flat face 226 of the swash plate by hydraulic pressure. Therefore, the spring bias provided by coil springs 250 is minimal but sufficient to maintain effective sliding contact between each shoe 224 and flat face 226 in the absence of hydraulic pressure at the valve end of each respective cylinder 214. The minimal bias of springs 250 not only facilitates assembly but also prevents entrapment of tiny dirt and metal detritus encountered during assembly and occasioned by wear.

Figure 5:
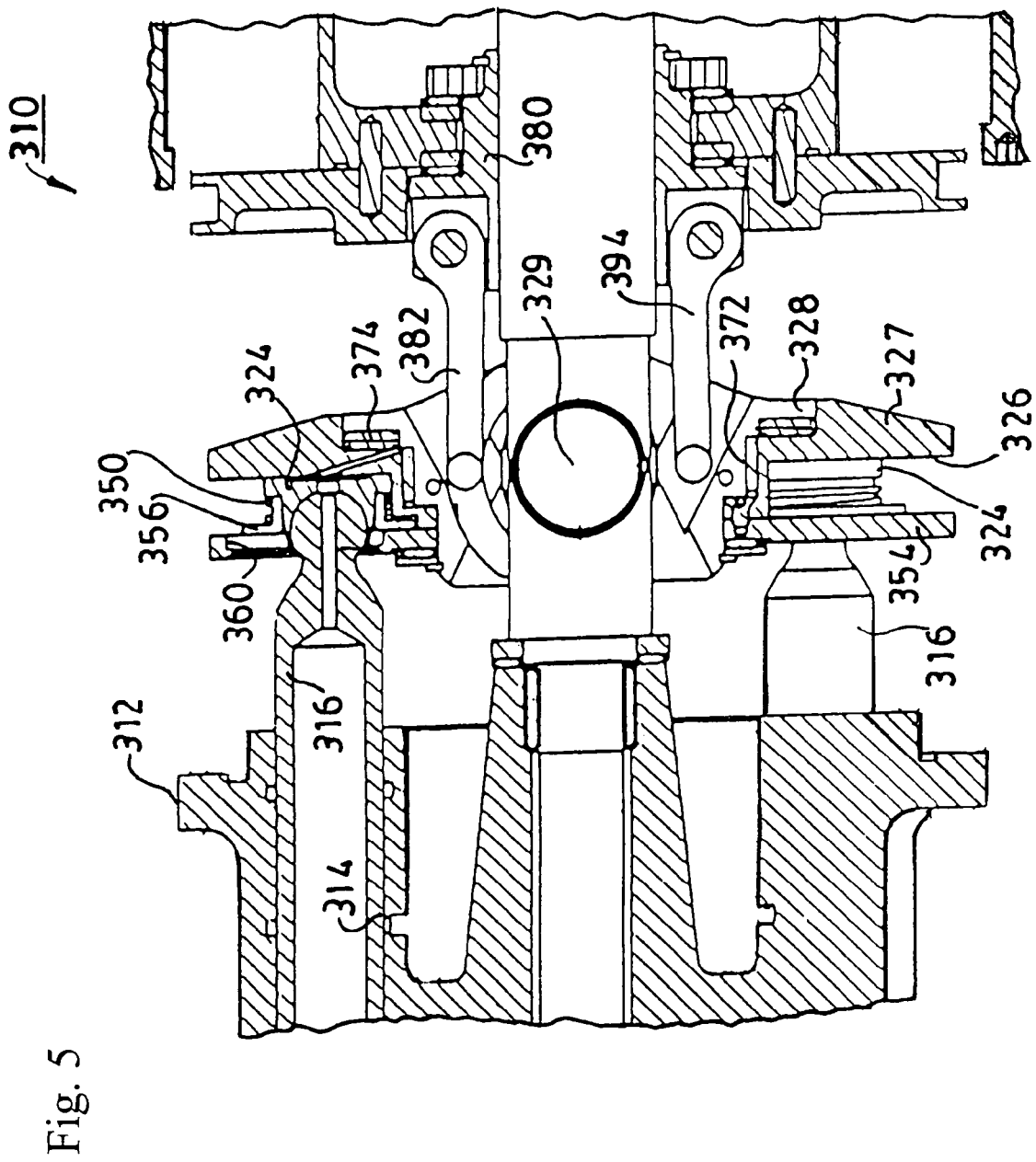
FIG. 5 shows a partially schematic and cross-sectional view of a hydraulic machine with a split swash plate.

Referring to FIG. 5, a third hold-down assembly for a hydraulic machine 310 includes an improved conventional split swash plate arrangement. A plurality of pistons 316, each including a respective sliding shoe 324, reciprocates in respective cylinders 314 formed in cylinder block 312 that is identical to cylinder block 112. Each shoe 324 slides on the flat face 326 formed on a wobbler 327 that is mounted on a mating rotor 328 by appropriate bearings 372, 374 that permit wobbler 327 to nutate without rotation while rotor 328 both nutates and rotates in a manner well known in the art. The inclination of wobbler 327 and rotor 328 about axis 329 is controlled by the position of a sliding collar 380, a control link 382, and a balancing shadow link 394.

Shoes 324 are held down by a hold-down assembly substantially identical to the first hold-down assembly, however, the large single coil spring 150 is replaced by a plurality of smaller individual coil springs.

A hold-down plate 354 is fixed to wobbler 327. Each shoe 324 receives the circumferential extension of a respective special washer 356, and the neck of each piston 316 is positioned within one of a corresponding plurality of respective openings 360 formed through hold-down plate 354. While wobbler 327 does not rotate with rotor 328, the nutational movement of wobbler 327 is identical to the nutational movement of rotor 328 and, therefore, the relative motions between shoes 324 and the flat surface 326 of wobbler 327 are also identical to those in the first hold-down assembly.

A plurality of individual coil springs 350 provides the minimal spring bias to maintain effective sliding contact between each shoe 324 and flat face 326 of wobbler 327 in the absence of hydraulic pressure at the valve end of each cylinder 314. Each coil spring 350 is positioned circumferentially about each shoe 324, being captured between each special washer 356 and a collar formed just above the bottom of each shoe 324.

Figure 6:
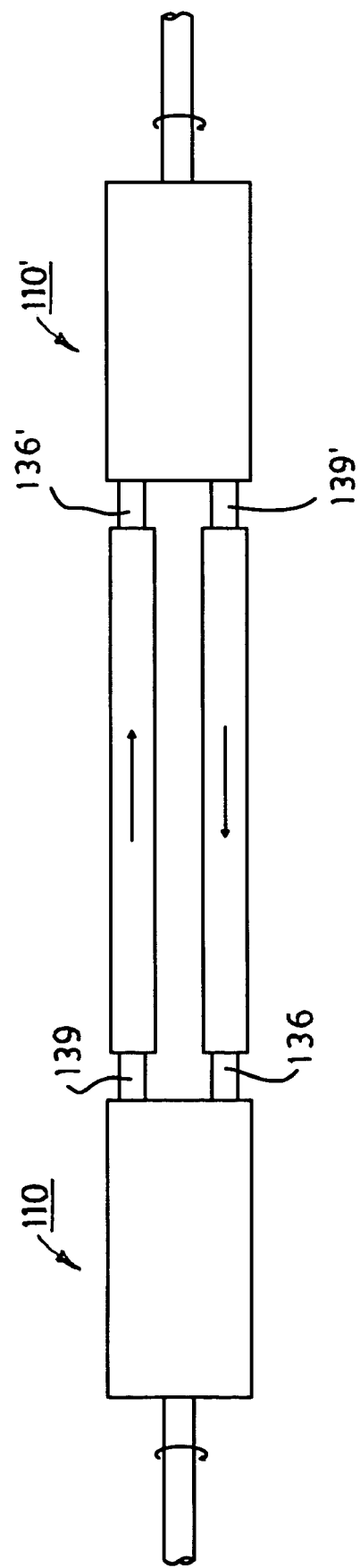
FIG. 6 shows a view of a "closed loop" arrangement of two hydraulic machines as known in the prior art.

Referring to FIG. 6, each hydraulic machine, whether a motor or a pump, is preferably paired with another hydraulic machine, a mating pump or motor, in a well known "closed loop" arrangement. For example, the high-pressure fluid exiting from the outlet 139 of hydraulic machine 110 is directly delivered to the input 136' of a mating hydraulic machine 110', while the low-pressure fluid exiting from the outlet 139' of hydraulic machine 110' is directly delivered to the input 136 of mating hydraulic machine 110. Hydraulic machine 110 and hydraulic machine 110' may be identical in structure except that hydraulic machine 110 is used as a pump and hydraulic machine 110' is used as a motor. A portion of the fluid in this closed loop system is continually lost to "blow-by" and is collected in a sump, and fluid is automatically delivered from the sump back into the closed loop to maintain a predetermined volume of fluid in the closed loop system at all times.

Hydraulic Machine with Full Gimbal

During recent developmental work on a long-piston hydraulic machine, vibration at higher speeds and pressures has been noted. Some interference between the heads of the long pistons and the hold-down plate has also caused the bronze shoes on the pistons to loosen. Repetitive impacts between the bronze shoes and the hold-down plate increase the operating noise of these hydraulic machines. Although these hydraulic machines show remarkably low blow-by of lubricating hydraulic fluid in comparison to prior art hydraulic pumps and motors, a significant amount of this blow-by results from the loosening of the bronze shoes over time. Eliminating the repetitive impacts significantly improves the performance of these machines. This undesirable interference occurs during the relative lemniscate motion shared by the piston shoes as they slide over the surface of the wobbler portion of the split swash plate.

To improve the performance of the hydraulic machines of U.S. Patent App. No. 2004/0168567 the wobbler is further stabilized, and that is accomplished with a full gimbal. The force applied by the sliding shoe of each piston on the wobbler has both an axial component and a radial component. As the angle of the swash plate increases, the radial force component increases, and the full gimbal provides structural support to oppose this force and maintain the nutating motion of the wobbler.

A split swash plate of a long piston hydraulic machine includes a rotating and nutating "rotor" that is driven by the input axle and a nutating-only "wobbler" that rides on the surface of the rotor on bearings. The sliding shoes on the long piston heads move in a "figure eight" path over the surface of the nutating wobbler. However, during the relative motion of the sliding shoes on the wobbler, this "figure eight" is really a lemniscate in three dimensions on the surface of an imaginary sphere having a diameter that decreases as the angle of the swash increases.

In an embodiment of the present invention, the wobbler is stabilized by a full gimbal. As the wobbler nutates, the distribution of piston shoe pressure on the wobbler varies during each cycle, as the individual pistons change direction. This varying pressure tends to introduce undesired vibrations into the nutating wobbler motion. The full gimbal helps to maintain the nutating-only motion of the wobbler and reduce the undesired vibrations. The velocity of the shoe slippage is directed by the gimbal-restrained wobbler.

Figure 7:
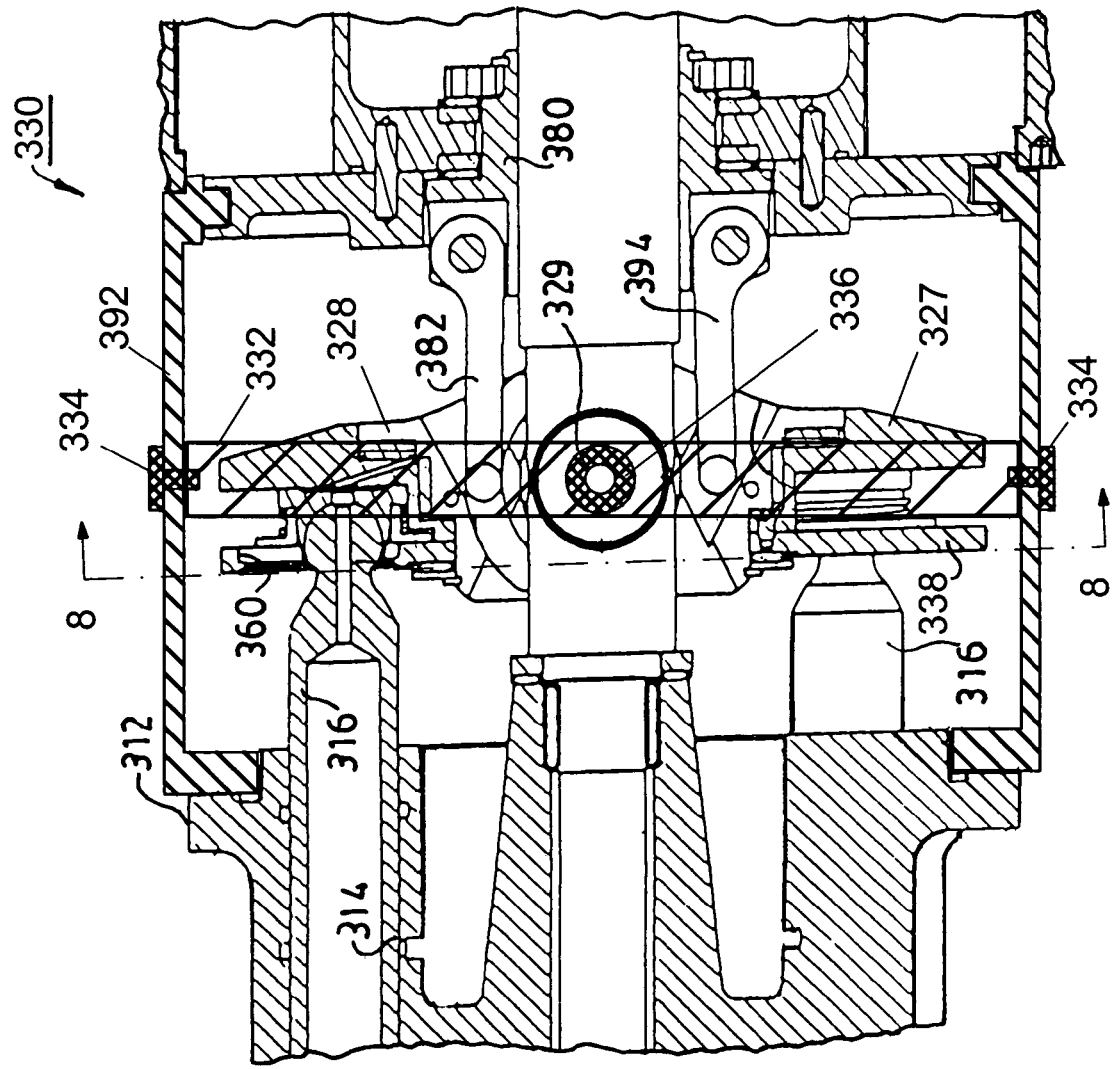
FIG. 7 shows a hydraulic machine of the present invention with a full gimbal.

Referring to FIG. 7, a long-piston hydraulic machine 330 with a gimbal is shown. A plurality of pistons 316, each including a respective sliding shoe, reciprocate in respective cylinders 314 formed in cylinder block 312. Each shoe 324 slides on the flat face formed on wobbler 327 that is mounted on mating rotor 328 by appropriate bearings that permit wobbler 327 to nutate without rotation while rotor 328 both nutates and rotates in a manner well known in the art. The inclination of wobbler 327 and rotor 328 about axis 329 is controlled by the position of sliding collar 380, control link 382, and balancing shadow link 394. Shoes are held down by a hold-down assembly substantially identical to the first hold-down assembly, however, the large single coil spring is replaced by a plurality of smaller individual coil springs.

The gimbal includes a yoke 332, a first pair of gimbal pins 334 connecting yoke 332 to the swash plate housing 392, and a second pair of gimbal pins 336 connecting yoke 332 to wobbler 327. Yoke 332 forms a complete annulus around the wobbler. Gimbal pins 334 are located at 180 degrees to each other. Gimbal pins 336 are located at 180 degrees to each other and at 90 degrees to gimbal pins 334. The gimbal structure allows wobbler 327 to nutate but inhibits rotational movement of wobbler 327.

A hold-down plate 338 is fixed to wobbler 327. Each shoe receives the circumferential extension of a respective special washer, and the neck of each piston 316 is positioned within one of a corresponding plurality of respective openings formed through hold-down plate 338. While wobbler 327 does not rotate with rotor 328, the nutational movement of wobbler 327 is identical to the nutational movement of rotor 328 and, therefore, the relative motions between shoes and the flat surface of wobbler 327 are also identical to those in the first hold-down assembly.

A plurality of individual coil springs provides the minimal spring bias to maintain effective sliding contact between each shoe and the flat face of wobbler 327 in the absence of hydraulic pressure at the valve end of each cylinder 314. Each coil spring is positioned circumferentially about each shoe, being captured between each special washer and a collar formed just above the bottom of each shoe.

In another embodiment of the present invention, the holes in the hold-down plate are elongated rather than circular. The full gimbal is anchored at two points around the wobbler. Computer modeling shows that increasing the elongation of the piston holes in the hold-down plate, especially the holes which are the farthest away from the two anchor points, eliminates impact between the piston shoes and the edges of the holes of the hold-down plate.

Figure 8:
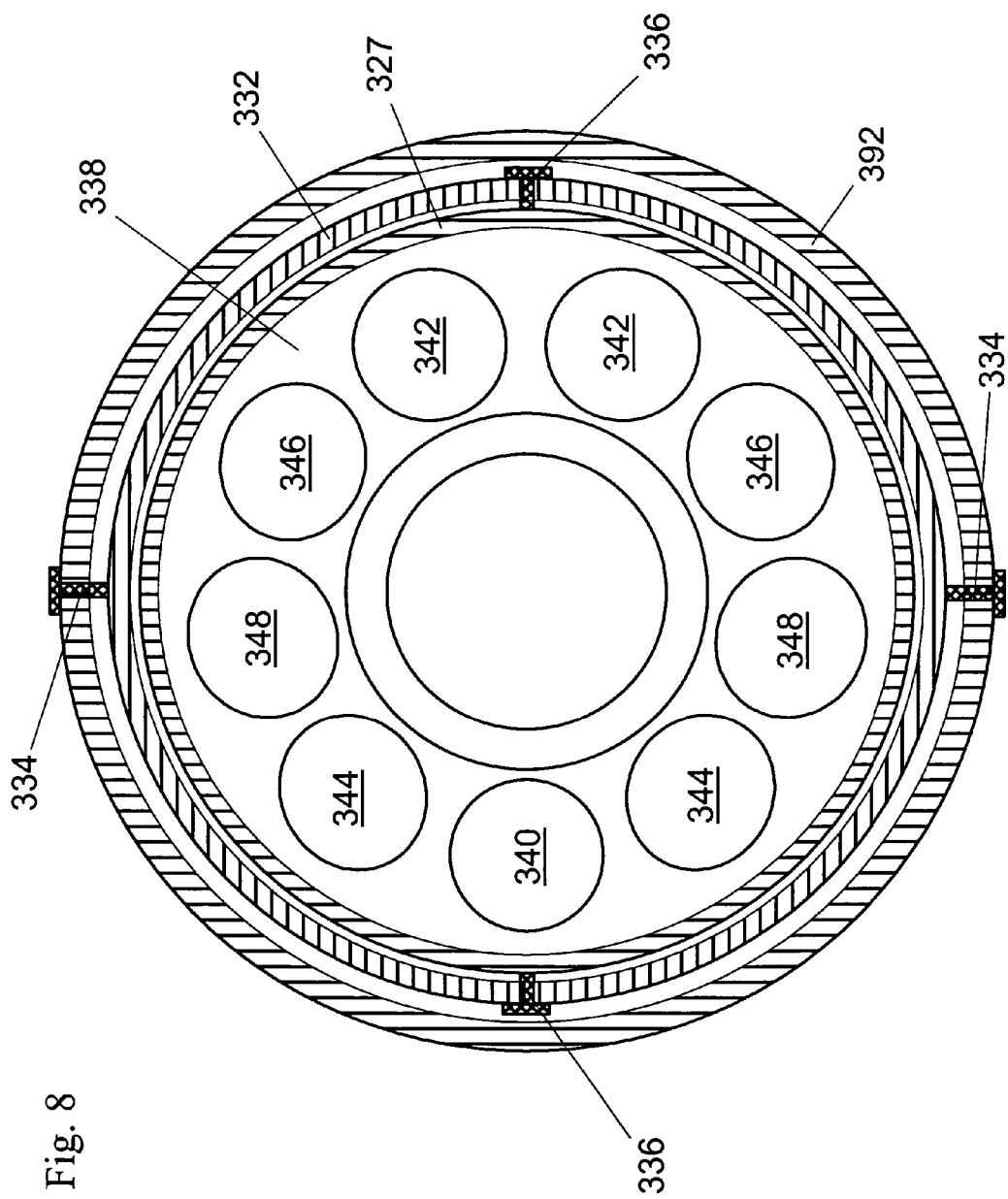
FIG. 8 shows a hold-down plate of the present invention with elongated holes, the view being taken along plane 8-8 of FIG. 7.

Referring to FIG. 8, hold-down plate 338 preferably has one opening 340 directly aligned with one of two gimbal pins 336 connecting yoke 332 to wobbler 327. The relative locations of gimbal pins 334, 336 in relation to hold-down plate 338 are shown schematically in FIG. 8. Opening 340 is nearly circular. The shapes of the openings 340, 342, 344, 346, 348 are more elongated the farther the openings are from gimbal pins 336.

Computer models of this new design indicate it is possible to use only a combination of two hydraulic machines, one as a pump and one as a motor, in a closed hydraulic loop as an infinitely variable transmission for many models of present day vehicles. However, the inventors believe that the addition of the described orbital gear complex provides a more efficient transmission than these hydraulic machines acting alone. This hydraulic/orbital gear transmission provides a significantly improved automotive transmission that can be scaled up or down to meet a wide spectrum of weight and size requirements.

Orbital Transmission

Although the hydraulic pump and motor may be used in combination as a stand-alone transmission, the addition of the orbiter allows a significant decrease in the size of the pump and motor. In an orbital transmission of the present invention, the hydraulic pump and motor are never doing 100% of the work. The reduction of load on the hydraulics as a result of the gearing also increases the durability of the pump and motor.

Figure 9:
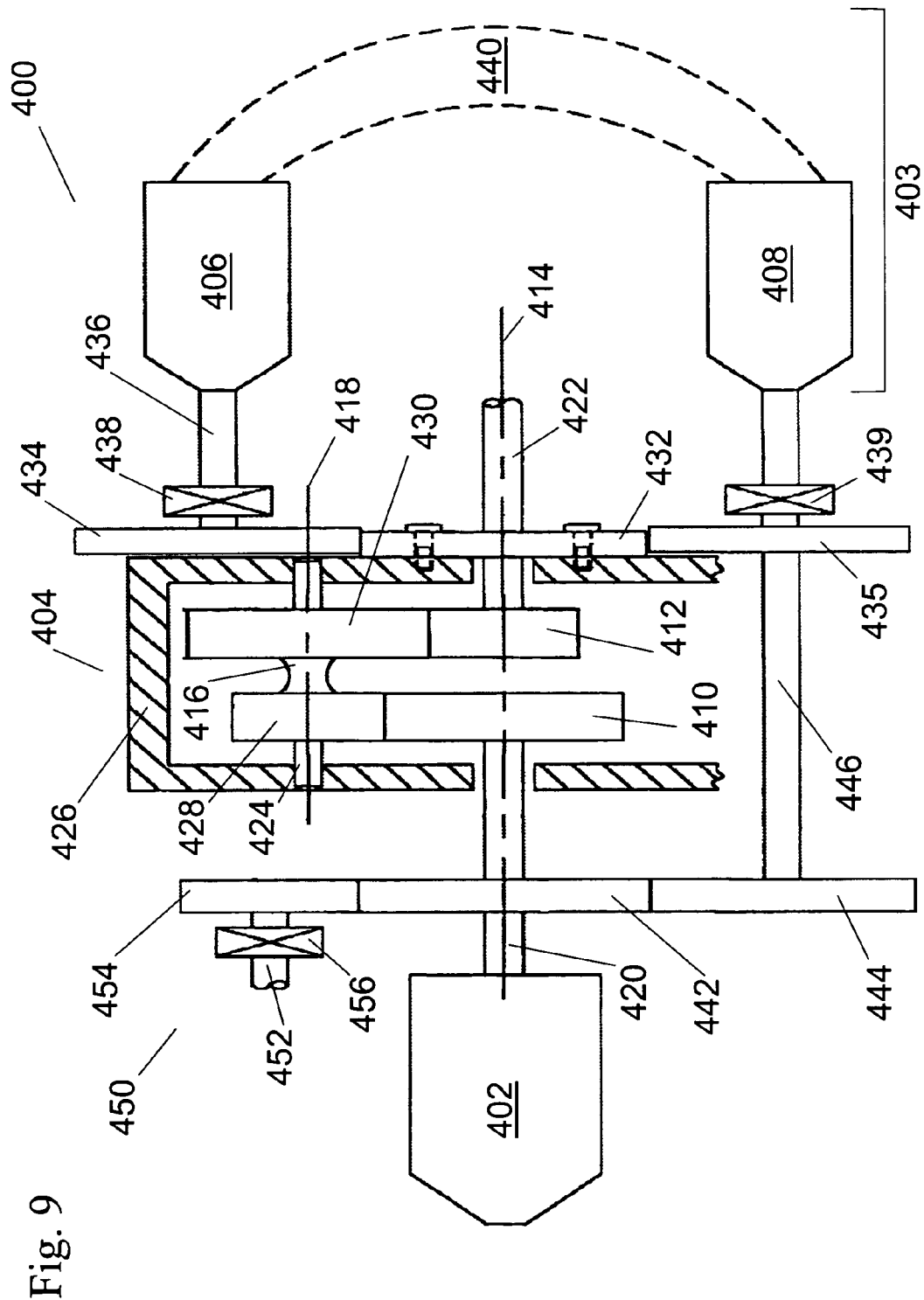
FIG. 9 shows an orbital transmission in an embodiment of the present invention.

A transmission 400 is shown in FIG. 9 in an embodiment of the present invention. An engine 402 is shown connected to the invention's transmission that includes only a minimal orbiter 404 and a variable web-rotating device 403. In one embodiment, variable web-rotating device 403 includes an electric motor 406 in combination with an electric generator 408 with an electrical connection 440 between them. In another embodiment, variable web-rotating device 403 includes a variable hydraulic motor 406 in combination with a variable hydraulic pump 408 with a hydraulic connection 440 between them. The transmission is described below with a hydraulic pump and a hydraulic motor as a preferred web-rotating device.

Orbiter 404 includes only an input gear 410 and an output gear 412, both mounted for rotation about a first axis 414, and a cluster gear 416 mounted for rotation about a second axis 418 parallel to first axis 414. Input gear 410 is fixed for rotation with the drive shaft 420 of engine 402, while output gear 412 is fixed for rotation with an output shaft 422. Cluster gear 416 is fixed to an orbit shaft 424 supported for rotation in a web 426, and web 426 is itself mounted to rotate about first axis 414, thereby permitting orbit shaft 424 and cluster gear 416 to orbit, respectively, about first axis 414, as well as about input gear 410 and output gear 412. Cluster gear 416 has two sets of gear teeth 428, 430 that mesh, respectively, with the teeth of input gear 410 and output gear 412.

The gear tooth ratios between input gear 410 and cluster gear 428, and between cluster gear 430 and output gear 412, are selected so that, when rotation of web 426 is prevented, output gear 412 rotates at a predetermined overdrive of rotation of input gear 410. This is in contrast to the teachings of the prior art, where a gear reduction is taught, as in the orbital gearing of previously cited U.S. Pat. No. 6,748,817. For instance, in a preferred embodiment of the present invention, gear tooth ratios are selected as shown in Table 1.

TABLE 1

| Gear | No. of Teeth |
| --- | --- |
| Input gear 410 | 36 |
| Cluster gear 428 | 27 |
| Cluster gear 430 | 36 |
| Output gear 412 | 27 |

With this gearing example, when rotation of web 426 is prevented, output gear 412 rotates at an overdrive of approximately 0.6:1 of the rotation of input gear 410.

Fixed to the outside of web 426 is a gear 432 that meshes with a motor gear 434 that is connected to the motor shaft 436. Motor shaft 436 may be made disconnectable to motor gear 434 by an optional first clutch 438 that, preferably, is a simple jaw clutch, but may be any type of clutch. Clutch 438 provides a true-neutral safety feature by assuring that the vehicle is in neutral, especially important at start-up, regardless of the output of variable web-rotating device 403. For the purpose of illustration, motor shaft 436 is driven by hydraulic control motor 406 and rotates motor gear 434 and web gear 432 in a 1:1 relationship. The ratio between the motor gear 434 and the web gear 432 may fall within a range without deviating from the spirit of the invention. This ratio, along with the gear tooth ratio, may be varied to produce particular input-to-output transmission gear ratios for particular settings of variable web-rotating device 403. Control motor 406 is operated, in turn, by hydraulic fluid delivered from hydraulic pump 408 through a "closed-loop" hydraulic circuit 440. An auxiliary drive gear 442 that is fixed to engine drive shaft 420 causes the rotation of a first mating gear 444 and a pump shaft 446 in a 1:1 relationship.

Although the operation of hydraulic pump/motor combinations is well known in the art, operation of a pump/motor especially suited for this transmission is discussed in detail in this disclosure. The auxiliary rotation of pump shaft 446 by engine drive shaft 420 permits hydraulic pump 408 to create a flow of hydraulic fluid for control motor 406 in accordance with the adjusted angle of the swash plate (not shown) of pump 408.

Forward Operation of IVT

As an illustration of the operation of a transmission of the present invention, the orbital gear tooth ratios set forth above are used here to calculate the values given Table 2. Table 2 shows the conditions of the pump and motor swash plates, the resulting web rotation rate, output shaft rotation rate and transmission ratio at discrete stages from reverse to neutral to overdrive. However, it should be understood that the infinitely variable transmission goes through a continuum of transmission ratios over this entire range. An idling speed of 500 RPM is used for the sample calculations.

TABLE 2

| Vehicle Speed | Engine RPM | Pump Swash | Motor Swash | Web RPM | Output RPM | Transmission Ratio |
|---|---|---|---|---|---|---|
| Reverse | 500 | 25° | 10° | 1250 | −83 | −6:1 |
| Neutral | 500 | 25° | 10.9° | 1143 | -0- | 1:0 |
| Low 1 | 500 | 25° | 13.5° | 929 | 167 | 3:1 |
| Low 2 | 500 | 25° | 15.2° | 821 | 250 | 2:1 |
| Drive | 500 | 25° | 25° | 500 | 500 | 1:1 |
| Overdrive 1 | 500 | 12.5° | 25° | 250 | 694 | 0.7:1 |
| Overdrive 2 | 500 | 0° | 25° | -0- | 889 | 0.6:1 |
| Overdrive 3 | 500 | −7.1° | 25° | −143 | 1000 | 0.5:1 |

With reference to Table 2, is should be initially noted that as the angle of the swash plate of motor 406 is continuously increased in a positive direction, the rate of rotation of motor shaft 436 gradually slows, thereby slowing the rotation of web 426 and causing output shaft 422 to slowly increase its rate of rotation.

With control motor 406 connected to web 426 and the swash plate of pump 408 set at its maximum inclination (i.e. 25°), setting the swash plate angle of motor 406 to 10.9° causes web 426 to rotated at a speed that causes output shaft 422 to come to a stop, i.e., to what is, in effect, a "geared neutral" condition.

To change from "Neutral" condition to "Drive", the swash angle of pump 408 is held at 25° while the swash angle of motor 406 is continuously increased to 25°, where the transmission ratio equals 1:1. From "Drive" to a predetermined "Overdrive 2", the swash angle of motor 406 swash is held at 25° while the swash angle of pump 408 is continuously decreased to 0°. When the swash plate of pump 408 reaches 0°, web 426 is stopped, and the speed of rotation of output gear 412 and output drive shaft 422 is greater than the speed of engine drive shaft 420 and input gear 410 by the overdrive predetermined by the basic gear complex referred to above.

As an important additional feature of the present invention, the swash angle of pump 408 may be decreased to a slightly negative angle, thereby reversing the direction of motor shaft 436 to extend the invention's "infinite overdrive" throughout a range beyond "Overdrive 2".

Therefore, as the speed of rotation of motor 406 and web 426 continuously decreases, the forward rotation of output shaft 422 continuously increases in speed through an infinite range of gear ratios from a high gear reduction (significantly greater than 3:1) to 1:1 and then on through an extended continuous overdrive without any gear shifting, clutch shifting, or any significant fluctuation in engine speed.

During any required speed reduction, such as braking, the swash plate angles are adjusted in the opposite direction toward the geared neutral position to achieve an appropriate gear reduction. Similarly, if additional power is required when the vehicle is in full overdrive, such as for climbing a hill or passing, the pump swash plate angle may be increased to provide an appropriate gear reduction or, of course, the engine speed may be increased.

Special attention is called to the fact that this just-described continuous and infinite-progression gear ratio change (from start-up to overdrive) occurs without any significant change in the speed of engine 402. The engine may be maintained at a relatively low and efficient operational level throughout the entire acceleration from a standing stop up to overdrive. This remarkable feature not only results in fuel savings but, more importantly, in significant reduction in pollution. This is particularly true for diesel engine vehicles, since the engine's selected operational speed can be predetermined at a "sweet spot" which optimizes performance. As is well known, when a diesel engine operates at a constant speed, it discharges little, if any, pollutants.

A further feature of the invention provides a tow/haul mode to achieve higher fuel efficiency and to reduce the duty cycle on the hydraulics when the vehicle is hauling heavy loads, towing a trailer, or travelling over steep terrain at highway speeds. This feature by-passes the hydraulic system and locks up the drive in a geared 1:1 with the vehicle engine. This is accomplished by the addition of a second clutch 439 that is used to engage a further gear 435 to pump shaft 446. Gear 435 is interconnected in a gear train with, and is the same size as, auxiliary drive gear 442, first mating gear 444, and web gear 432. Therefore, when first clutch 438 disengages motor 406 from motor gear 434 and second clutch 439 engages gear 435 to pump shaft 446, the direct gear train from engine 402 through gears 442, 444, 435 and 432, rotates web 426 at the same speed that engine 402 is rotating input gear 410. This results in the direct geared drive of both output gear 412 and output drive shaft 422 in a 1:1 relationship with engine 402.

"Stopping" and Rearward Operation of IVT

When control motor 406 is connected to web 426, and the swash plate of pump 408 is set at its maximum inclination (i.e. 25°), the swash plate of motor 406 is set to achieve "Neutral" (i.e., at 10.9° for the previously-given gear ratios). Under these conditions, output shaft 422 is stationary. As indicated above, this in effect provides a "geared neutral" in which web 426 is held by a constant torque in a stopped position for start up and when starting in traffic. However, it should be noted that at any time under these conditions, clutch 438 can be disengaged and a "true neutral" can be achieved to disconnect the drive from the vehicle wheels completely.

If the angle of the swash plate of motor 406 is moved in a slightly negative direction from its geared neutral setting (e.g., by 1-3°), control motor 406 continues to rotate web 426 in the same direction that achieves "geared neutral", but web 426 rotates at a slightly faster speed. The net effect is that output shaft 422 now rotates at a relatively high gear reduction in the rearward direction, i.e., in "Reverse".

When the setting of the swash plate of motor 406 is continuously increased in a negative direction (i.e., beyond the setting used to bring output gear 412 to a stop), rotations of web 426, output gear 412, and output shaft 422 all continuously increase in the forward direction. If control motor 406 is "neutralized" (e.g., by disengaging clutch 438), an idling-speed rotation of input gear 410 will automatically cause cluster gear 416 to rotate web 426 in the rearward direction at the exact speed that causes output gear 412 to come to a complete stop. That is, when rotational control of the web is neutralized, the minimal orbiter of this invention automatically seeks the position of minimum torque.

Therefore, it may not be necessary to program precisely the adjustment of the swash plate of motor 406 in order create the required predetermined speed reversal of the web for bringing the transmission to zero speed when stopping the vehicle. We have developed a preferred hydraulic pump/motor embodiment for the invention that, without a first clutch 438, still permits control motor 406 to be adjusted appropriately to allow the vehicle to come to a complete stop whenever the speed of input gear 410 is reduced to idling engine speed.

Power Takeoff

As is well known in the art, power takeoff shafts are often provided on tractors and trucks to permit auxiliary equipment to be operated from the vehicle's engine. Therefore, one other feature of the transmission is a power takeoff assembly 450 that includes a power takeoff shaft 452 and a power takeoff gear 454 connected by a clutch 456.

Power takeoff gear 454 is driven by auxiliary drive gear 442. Power takeoff gear 454 generally "free-wheels", being disconnected from power takeoff shaft 452 by normally disengaged clutch 456. However, when clutch 456 is engaged, power takeoff shaft 452 also rotates to operate auxiliary equipment.

Hydraulic By-Pass Circuit

A valve-regulated "by-pass" assembly is preferably incorporated in the closed-loop hydraulic circuitry 440 shared by the hydraulic pump 408 and motor 406. (Such a by-pass arrangement is disclosed in above-referenced U.S. Pat. No. 6,748,817. A pair of "by-pass" passageways connects the opposite sides of the closed-loop and pass through a cylinder, being blocked by the piston portions of a spool valve. A pair of stems is located on the spool valve so that, when the spool valve is moved in one direction, the stems permit hydraulic fluid to flow through by-pass passageways. A sensor is responsive to upper and lower levels in selected parameters of vehicle operation (e.g., vehicle speed and/or hydraulic pressure in the closed-loop). Sensing a first level of these selected parameters causes the spool valve to move in one direction to open the passageways (e.g., whenever the vehicle speed is reduced and approaches a stopped condition), while sensing a second level restores the valve to the opposite position, returning the closed-loop hydraulic circuit 440 to its normal condition.

Activation of the spool valve to open the by-pass circuit permits shaft 436 of control motor 406 to be moved independently even though the swash plate of pump 408 is being driven or is being held stopped at 0°. Therefore, the by-pass assembly can be used to reduce the transmission load during engine start-up, thereby replacing a vehicle's fly-wheel clutch. In this regard, since the sensor can be used to sense a significant change in fluid pressure in the closed-loop hydraulic circuit 440, the by-pass assembly can also serve as a safety device, preventing any exceptional overload of the hydraulic system.

As a further feature of an orbital transmission of the present invention, the efficiency of the hydraulic pump and motor in combination with the orbital gearing allows sufficient power to be transmitted to the wheels, while the engine speed is maintained around 500 RPM. This feature provides significant fuel savings despite the fact that the engine runs well below the "sweet spot" for which transmissions of the prior art are designed. The sweet spot of an engine is the region of the efficiency map where the engine is most efficient at converting fuel into mechanical power. For most automobile engines, the sweet spot is found in the range of 1500 RPM. A transmission of the present invention improves fuel economy despite maintaining the engine at a speed with reduced efficiency. The loss in efficiency is more than compensated by the reduced fuel requirements of running at 500 RPM. A further advantage of running at such low engine speeds is a reduced pressure demand on the hydraulic pump and motor, thereby reducing the duty cycle on the hydraulics and further improving their durability.

In terms of fuel economy, an orbital transmission of the present invention brings city driving efficiency up to highway driving efficiency. Since city driving accounts for about 60% of all driving, incorporation of a transmission of the present invention into automobiles would provide a significant fuel savings. Today's engines are designed to run most efficiently in the range of 1500 RPM. Of course, further fuel savings may be achieved by combining a transmission of the present invention with an automobile engine designed to run most efficiently around 500 RPM.

A transmission of the present invention is capable of varying the speed of the drive shaft with minimal changes to engine speed. Thus, the present invention allows engine speed to remain in a relatively narrow low-to-moderate range where the combustion in HCCI engines is more easily controlled. In a preferred embodiment, the engine 402 is an HCCI engine. A transmission of the present invention is highly compatible with implementation of more fuel efficient HCCI engines on gasoline-powered vehicles.

Figure 10A:
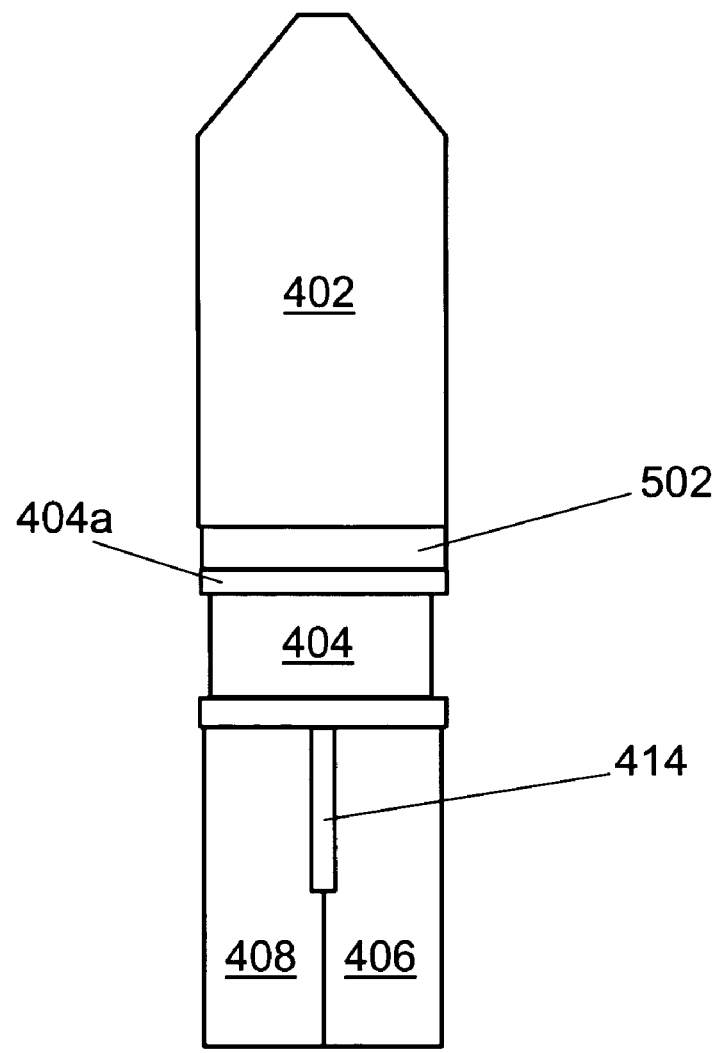
FIG. 10A is a schematic, approximately to scale, layout of the invention's modular hydro-mechanical transmission in place behind a standard automotive engine.
Figure 10B:
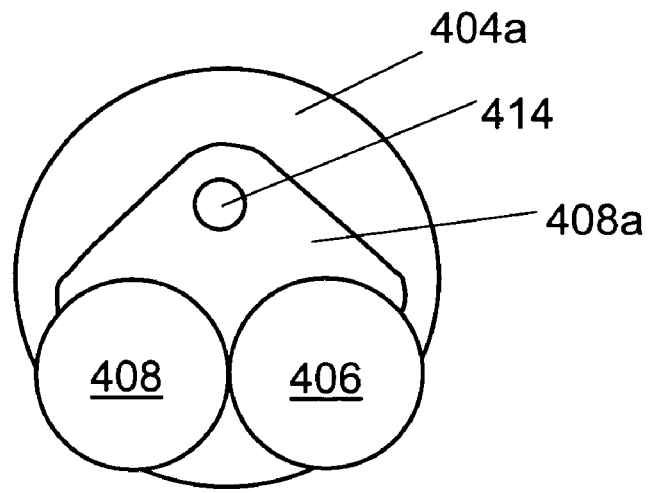
FIG. 10B is an end view of the modular transmission shown in FIG. 10A.

A final feature of the invention is now described with reference to FIG. 10A and FIG. 10B, which schematically illustrate the invention's modular hydro-mechanical transmission in place behind a standard automotive engine 402. In the same general arrangement just described above, the rotation of output shaft 414 of the invention's single orbiter 404 is regulated by the hydraulics of motor 406 and pump 408 which, in turn, are driven by engine 402. As shown, orbiter 404 is modularly mounted on plate 404a which is bolted to the fly-wheel housing 502 at the rear of engine 402. Similarly, motor 406 and pump 408 are modularly mounted on plate 408a.

For some vehicles, the modular combination of motor 406 and pump 408 can fulfill the full drive requirements of the vehicle. In such circumstances, modular orbiter 404 can be omitted, and, with minor modifications, motor 406, pump 408, and plate 408a can be modularly bolted directly to the fly-wheel housing 502 at the rear of engine 402.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A transmission for a primary engine, the transmission comprising:
    an orbiter comprising:
        an input gear mounted on a first axis and responsive to an input drive provided by the primary engine;
        an output gear mounted on said first axis; and
        at least one cluster gear meshed with only said input and output gears and mounted for rotation on an orbit shaft positioned parallel with said first axis; and
    an orbiter web supporting said orbit shaft and mounted for rotation about said first axis to permit the orbit shaft and the cluster gear to orbit, respectively, said first axis and said input and output gears;
    wherein the gear tooth ratios between said cluster gear and said input and output gears are selected so that, when rotation of the web is prevented, rotation of said input gear produces rotation of said output gear at a predetermined overdrive of the input drive.

2. The transmission of claim 1 further comprising a variable web-rotating device operatively connectable to the orbiter web for controlling rotation of the web and wherein, when said web is rotated in a first direction, as the speed of rotation of the web increases, said predetermined overdrive of the input drive is diminished to a 1:1 ratio and thereafter to a gear reduction of the input drive that increases relative to said speed of rotation of the web.

3. The transmission of claim 2, wherein rotating the web in said first direction at a predetermined speed stops the rotation of said output gear.

4. The transmission of claim 3, wherein rotating the web in said first direction at a speed greater than said predetermined speed reverses the direction of rotation of said output gear.

5. The transmission of claim 2, wherein rotating the web in a second direction opposite the first direction provides an infinitely varying overdrive greater than said predetermined overdrive.

6. The transmission of claim 2 further comprising a first clutch for selectively connecting said variable web-rotating device and said orbiter web.

7. The transmission of claim 6 further comprising:
    a plurality of gears interconnected consecutively to form a train of gears separate from said orbiter; and
    a second clutch for selectively connecting said input drive provided by said primary engine with said orbiter web;
    wherein, when said first clutch disconnects said variable web-rotating device and said orbiter web and when said second clutch connects said input drive and said orbiter web, said output gear and said orbiter web both rotate at 1:1 with said input drive.

8. The transmission of claim 2, wherein said variable web-rotating device comprises an electric motor in combination with an electric generator that is driven by said engine.

9. The transmission of claim 2, wherein said variable web-rotating device comprises a variable hydraulic motor driven by a variable hydraulic pump that is driven by said engine.

10. The transmission of claim 9, wherein said variable hydraulic motor and variable hydraulic pump are each enclosed in a respective housing and comprise:
    a cylinder block having a plurality of cylinders formed in the cylinder block and positioned circumferentially at a first radial distance about the rotational axis of a drive element;
    a plurality of respective pistons reciprocally mounted in said cylinders, each piston comprising a piston body and a spherical head connected to the piston body by a narrowed neck and each respective cylinder having an open head portion beyond which the piston head extends at all times;
    a split swash plate driven by said drive element and comprising:
        a variably-inclined rotor that rotates and nutates; and
        a wobbler having a flat face that only nutates;
        wherein the stroke of each piston varies in accordance with the inclination of said swash plate up to a predetermined maximum; and
    a respective sliding shoe pivotally and directly affixed to each piston head without any intermediate dog-bone, each respective sliding shoe being maintained in direct sliding contact with said flat face during all relative rotary motions between the piston and the flat face.

11. The transmission of claim 10, each hydraulic machine further comprising a gimbal comprising an annular yoke connected to said housing by a first pair of gimbal pins spaced 180° apart and connected to the wobbler of said split swash plate by a second pair of gimbal pins also spaced 180° apart, wherein each gimbal pin of said first pair lies 90° apart from each gimbal pin of said second pair.

12. The transmission of claim 11 wherein (a) said single orbiter, and (b) said variable hydraulic motor driven by said variable hydraulic pump are constructed as separate modules.

* * * * *